(12) United States Patent
Spriggel

(10) Patent No.: US 11,306,764 B1
(45) Date of Patent: Apr. 19, 2022

(54) LOCKNUT WITH A PRESETTABLE LOCKING FORCE

(71) Applicant: Daniel John Spriggel, Henderson, NV (US)

(72) Inventor: Daniel John Spriggel, Henderson, NV (US)

(*) Notice: Subject to any disclaimer, the term of this patent is extended or adjusted under 35 U.S.C. 154(b) by 0 days.

(21) Appl. No.: 16/873,716

(22) Filed: Jun. 11, 2020

(51) Int. Cl.
  *F16B 37/08* (2006.01)
  *F16B 39/16* (2006.01)
  *F16B 39/02* (2006.01)

(52) U.S. Cl.
  CPC ............ *F16B 39/16* (2013.01); *F16B 39/028* (2013.01)

(58) Field of Classification Search
  CPC ......... F16B 39/16; F16B 39/028; F16B 39/38
  USPC .......................... 411/249, 199, 254, 433, 274
  See application file for complete search history.

(56) References Cited

U.S. PATENT DOCUMENTS

| | | | | |
|---|---|---|---|---|
| 778,107 A * | 12/1904 | Burks | ...................... | F16C 25/06 411/290 |
| 5,662,445 A * | 9/1997 | Harbottle | ................ | F16C 25/06 411/290 |
| 5,749,691 A * | 5/1998 | Campbell | ........... | F16B 37/0864 411/270 |
| 5,868,538 A * | 2/1999 | Rathbun | ................... | D01H 7/16 411/433 |
| 5,906,401 A * | 5/1999 | Viegener | ............. | F16B 37/0842 411/230 |
| 6,789,986 B2 * | 9/2004 | Story, Jr. | ................. | B23Q 17/22 409/184 |
| 7,758,274 B2 * | 7/2010 | Paul | ........................ | A61B 17/00 403/104 |
| 10,520,113 B1 * | 12/2019 | Thompson | ................ | F16L 3/22 |
| 2012/0177460 A1 * | 7/2012 | Flaig | ........................ | F16B 39/38 470/19 |
| 2012/0230798 A1 * | 9/2012 | Sterle | ..................... | F16B 39/028 411/120 |
| 2012/0282060 A1 * | 11/2012 | Chung | ................... | F16B 39/028 411/310 |
| 2013/0129444 A1 * | 5/2013 | May | ....................... | F16B 39/284 411/234 |
| 2016/0327084 A1 * | 11/2016 | Hund | ..................... | F16B 39/028 |

* cited by examiner

*Primary Examiner* — Gary W Estremsky
(74) *Attorney, Agent, or Firm* — Jack C. Munro

(57) ABSTRACT

A locknut which uses a pivotable segment mounted within the locknut body to slightly deflect producing an increased friction (locking force) between the locknut body and bolt which is threaded into the locknut body. This locking force is preset at the construction of the locknut to assume a lower amount of force or a higher amount of force according to the desires of the customer purchasing the locknut. The amount of force could be adjustable by using a set screw.

8 Claims, 7 Drawing Sheets

LOCKNUT WITH A PRESETTABLE LOCKING FORCE

BACKGROUND OF THE INVENTION

This invention is being disclosed in relation to a bolt. However other types of fasteners could be used such as a screw.

Bolts that connect with a nut have been in common use for many years. Frequently the bolt installation is in a machinery environment where the machine is operated by an energy source such as gas or electricity. The machine inherently produces vibration and/or thermal expansion/contraction. This vibration and/or thermal expansion causes the nut to loosen on the bolt even though it has been tightly installed. This loosening can cause the nut to separate from the bolt which could result in the member that was being held onto the machine to disengage. This disengagement can be dangerous and could cause the machinery to fail which could result in injury or death to the human operator.

Another environment where loose nuts can be dangerous is wheel nuts that are used to attach wheels on vehicles. It is said that in the United States that forty to sixty accidents or incidents occur each month due to loose wheel nuts. Obviously in the world that number is much greater.

To overcome nuts loosening on their bolts, it has been common to use a locknut. There are literally hundreds of different types of locknuts all of which require the tight installation by a separate tool such as a wrench and also use of the same tool to disengage the locknut if disengagement is desired. Some locknuts are destroyed when removed thereby requiring a new locknut to be installed. It would be desirable to permit the locknut to be removable and reinstalled. The locking force of the locknut may be adjustable so the locking force can be increased in high vibrational installations to insure that the locknut will never disengage from the bolt even after an extended period of usage. In low vibrational environments it may be desired to have a low locking force that could be achieved by the user installing the locknut by hand not using a wrench. Most prior art locknuts are larger than conventional non-locking nuts. As a result these locknuts cannot be used in some environments. The locknut of this invention is the same size as conventional non-locking nuts and can be used in any environment that a conventional non-locking nut can be used.

Also many of the prior art locknuts include non-metallic parts such as plastic polymer inserts and cannot be used in corrosive or high temperature environments. The locknut of this invention is made entirely of metal such as stainless steel which can be used in high temperature and corrosive environments.

The cost of most prior art locknuts is substantially greater than conventional non-locking nuts. This increased cost prevents their usage in some environments. The cost of the locknut of this invention is only slightly greater than the cost of conventional nuts therefore not limiting its usage due to cost.

SUMMARY OF THE INVENTION

A locknut manufactured of metal such as stainless steel to provide for usage in corrosive environments. The locknut has a slot formed in its body which connects to the threaded through opening of the locknut. A shim is to be inserted into the slot closely conforming to the size of the slot. The shim has a central through opening which aligns with the through opening of the locknut. The through opening of the shim includes a half circular series of screw threads which are the same as the threads of the locknut. A half circular ring segment is inserted within the through opening of the shim. The inner surface of the ring segment is screw threaded which is identical to the threads of the shim. The ring segment is capable of pivoting up to approximately two degrees relative to the shim. In the first embodiment the pivoting amount is initially determined prior to threadably connecting a bolt to the locknut. As the bolt is threaded into the locknut the ring segment will produce a frictional connection between the bolt and the locknut which prevents unauthorized loosening of the locknut due to vibration. There is a second embodiment which uses a set screw which is threaded in a hole in the nut body. The set screw is moveable in a direction parallel to the longitudinal center axis of the threaded through opening of the nut body. The set screw abuts the ring segment. As the set screw is tightened the greater the pivoting of the ring segment and the greater the locking force.

There is a second embodiment which uses a set screw which is threaded in a hole formed in the nut body. The set screw is movable in a direction parallel to the longitudinal center axis of the threaded through opening of the nut body. The set screw abuts the ring segment and as the set screw is tightened the greater the pivoting of the ring segment and the greater the locking force.

DETAILED DESCRIPTION OF THE INVENTION

Figure 1:
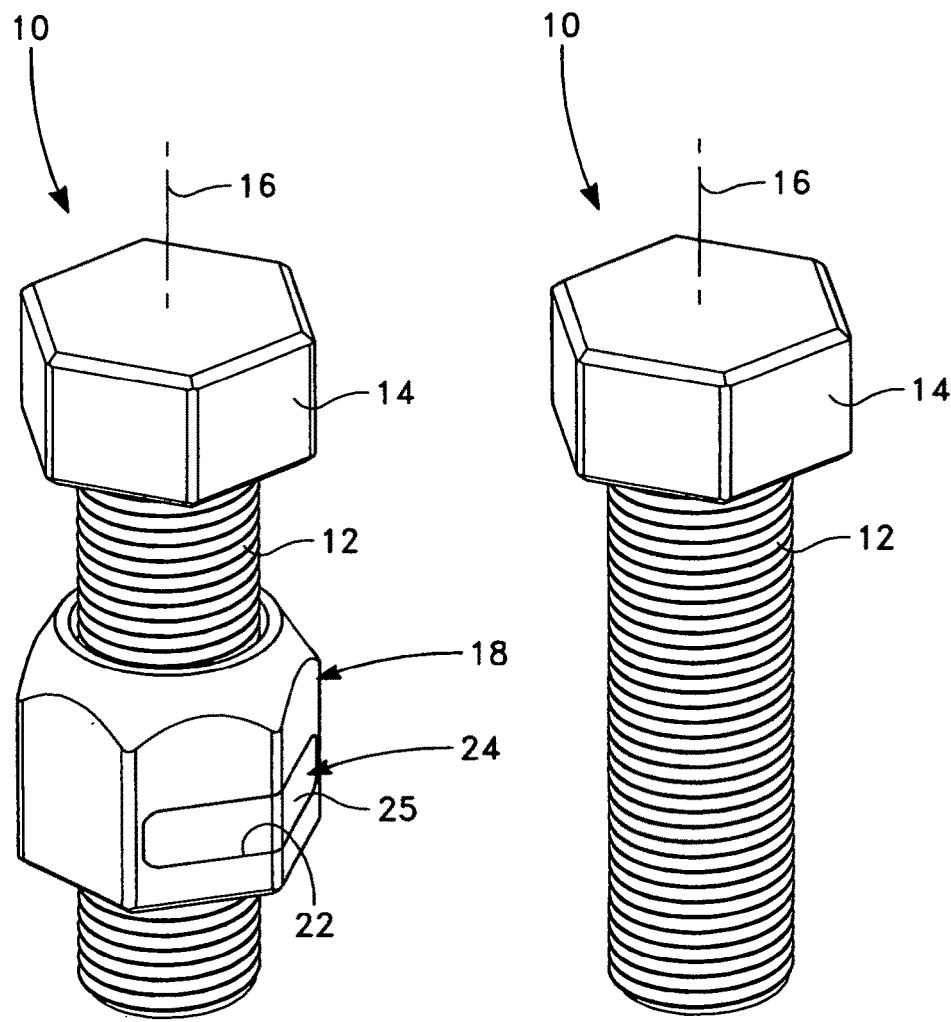
FIG. 1 is an isometric view of the first embodiment of locknut of this invention showing such assembled on a bolt.
Figure 2:
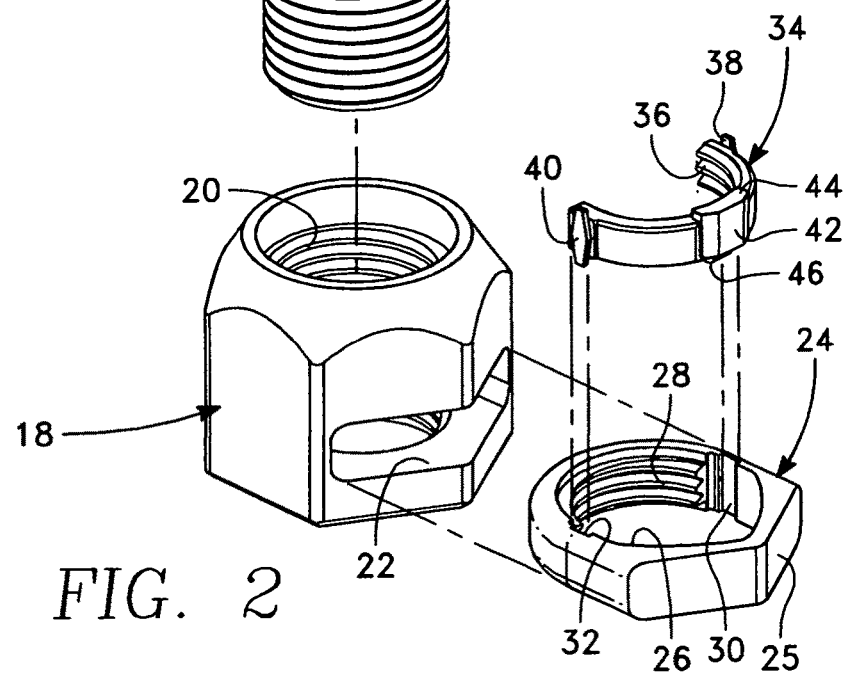
FIG. 2 is an isometric view of the structure of FIG. 1 showing the locknut disassembled.
Figure 3:
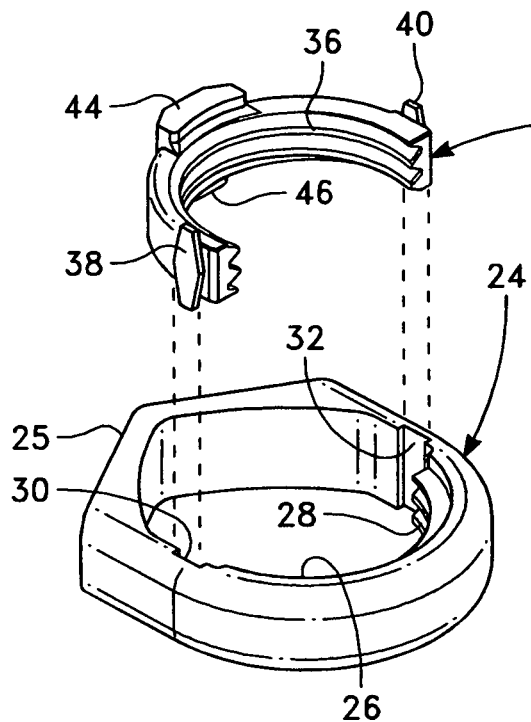
FIG. 3 is a frontal exploded isometric view showing the ring segment separated from the shim which is used in the locknut of this invention.
Figure 4:
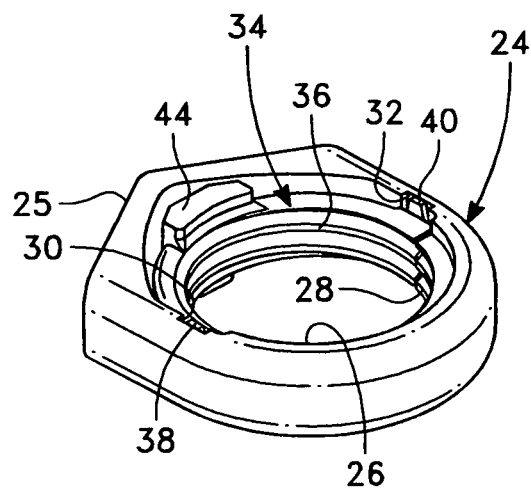
FIG. 4 is a frontal isometric view showing the ring segment assembled with the shim.
Figure 5:
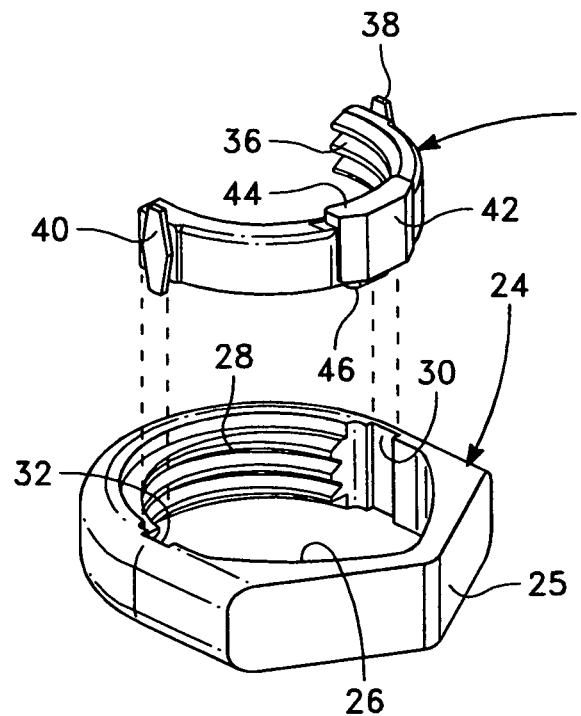
FIG. 5 is a rear isometric view of the structure shown in FIG. 3.
Figure 6:
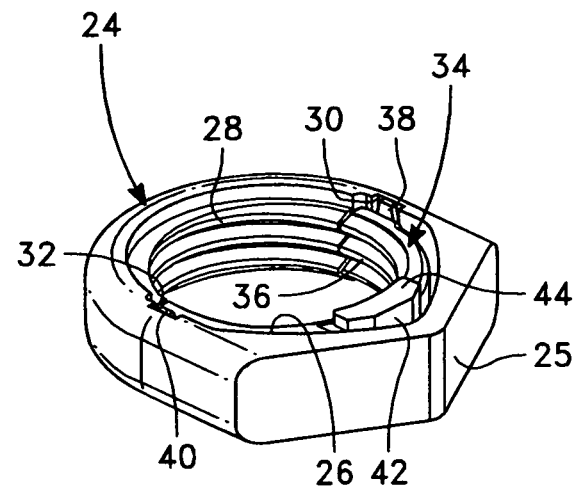
FIG. 6 is a rear isometric view of the shim shown in FIG. 4.
Figure 7:
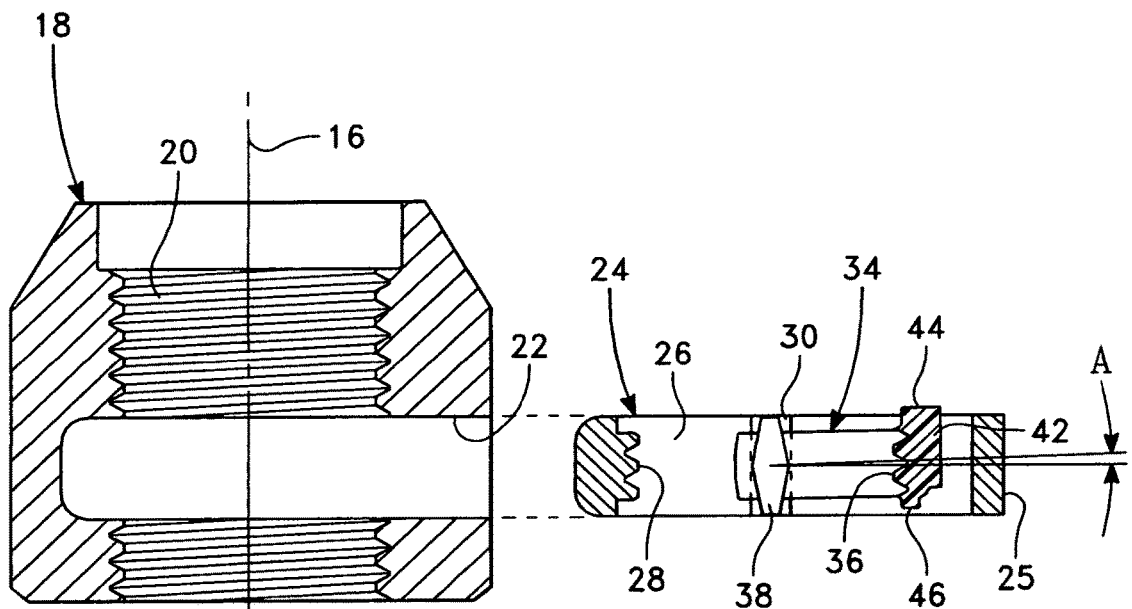
FIG. 7 is a side cross sectional view of the nut body and shim with the shim separated and not installed within the nut body.
Figure 8:
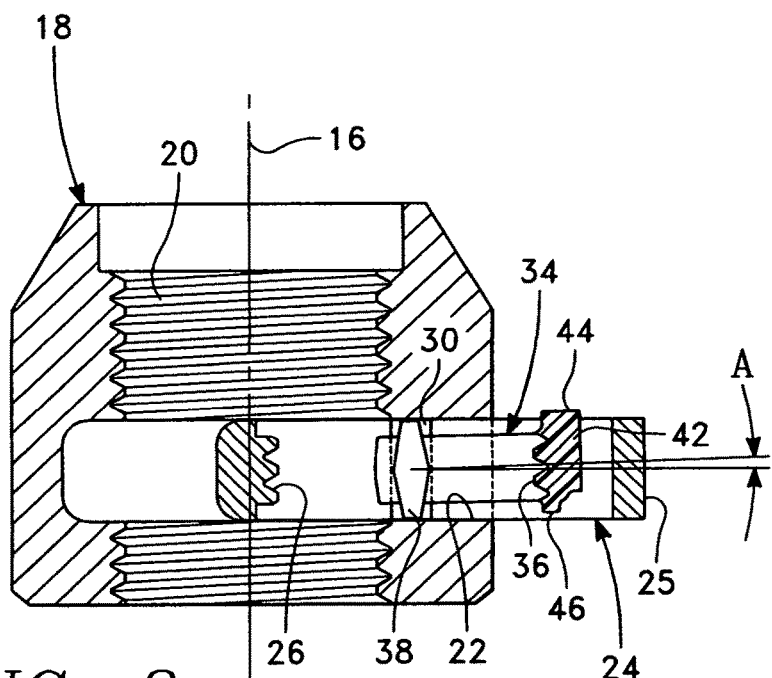
FIG. 8 is a view similar to FIG. 7 showing the shim partially installed within the nut body.
Figure 9:
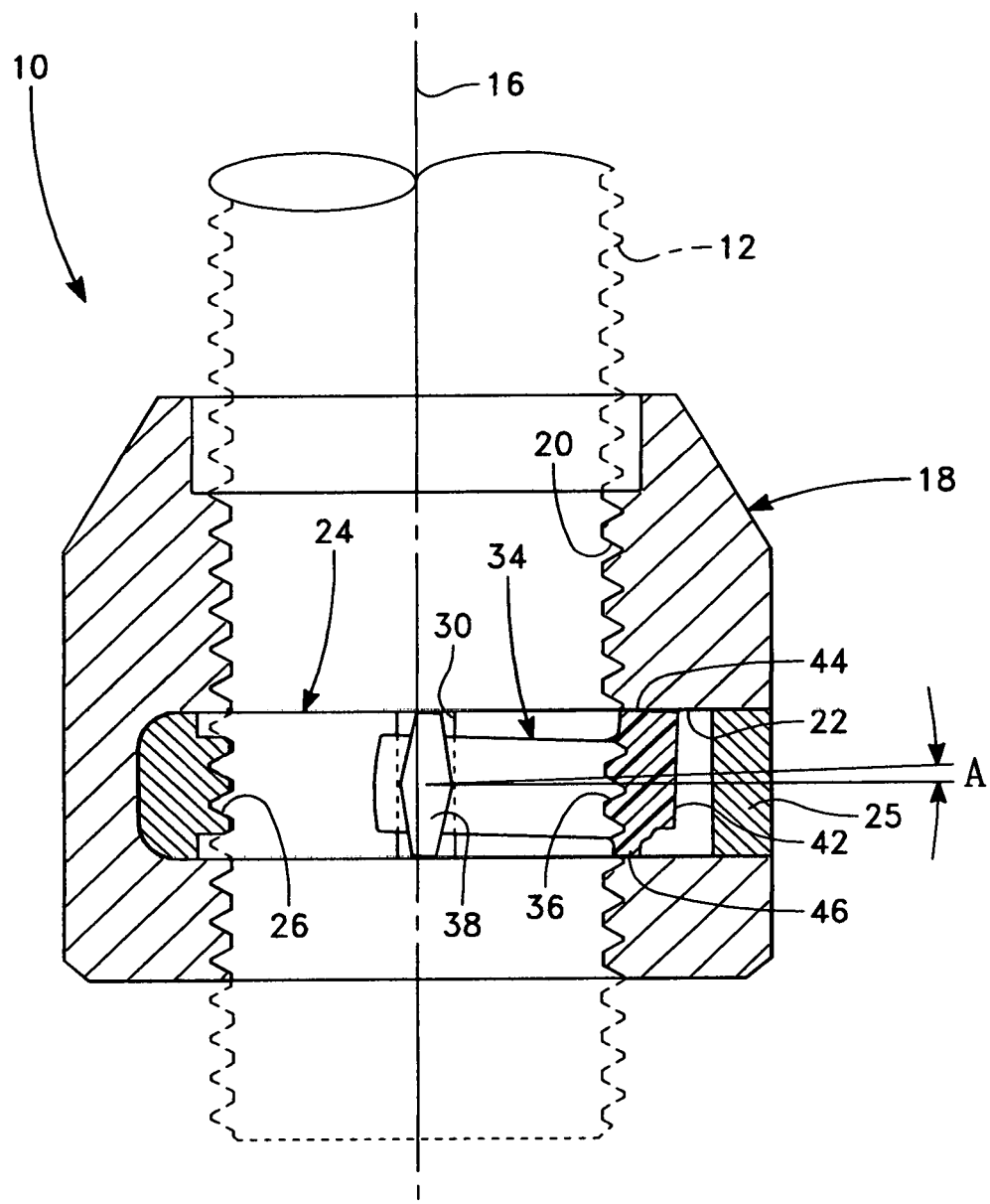
FIG. 9 is a view similar to FIG. 8 but showing the shim completely installed within the nut body.

Referring specifically to FIGS. 1, 2 and 9 there is shown a conventional bolt 10 which has a threaded shaft 12 which terminates at its upper end to a bolt head 14. Bolt 10 has a longitudinal center axis 16. A metallic nut body 18 has a central through opening 20. The nut body 18 is also shown in FIGS. 7 and 8. Formed within the nut body 18 is a transverse slot 22.

A metallic shim 24 is shown in all Figures. Shim 24 is designed to closely fit within slot 22. Shim 24 has a central though opening 26. When the shim is mounted within slot 22 the center of shim 24 will lie on axis 16. The back side of opening 26 has a series of screw threads 28 which matches the screw threads of opening 20. The threads 28 extend about one hundred and eighty degrees. Formed on the opening 26 and located directly adjacent the threads 28 is a right longitudinal groove 30. Diametrically opposite groove 30 is a left longitudinal groove 32. Grooves 30 and 32 are identical in size and shape.

Metallic ring segment 34 comprises one half of threads 36 which match threads 28. On the outer surface of the ring segment 34 and located at one end is an ear 38. Also on the outer surface of ring segment 28 and located at the opposite end of the ring segment 28 is an ear 40. Also mounted on the outer surface of the ring segment 28 is a loading foot 42. Loading foot 42 is located midway between ears 38 and 40. Loading foot 42 has an upper surface 44 midway between ears 38 and 40. Loading foot 42 has an upper surface 44 which is located a short distance (a few thousandths of an inch) above the upper edge of ring segment 34. This distance can be preselected to be a thousandth or two of an inch higher in some models or slightly lower in some other models. The higher the upper surface 44, the greater the locking force. The ring segment 28 has a stop lug 46 located at its bottom edge opposite the loading foot. The outer edge 25 is designed to be flush with the exterior surface of the nut body 18. The ring segment 34 has to be located next to the outer edge 25. That position is required so the upper edge of the slot 22 will contact the upper surface 44 of the loading foot 42 and the stop lug 46 will contact the lower edge of slot 22.

The ring segment 34 is to be inserted into the central through opening 26 so the threads 36 will be located opposite threads 28. In this position the ear 38 will be located within groove 30 and ear 40 will be located within groove 32. The ears 38 and 40 are capable of a limited amount of pivotal movement relative to ring segment 34. This pivotal movement occurs when the ring segment 34 is deflected an angle A (see FIGS. 7-9). This deflection occurs when the upper edge of the slot 22 presses on the loading foot 42 and stop lug 46 is in contact with the lower edge of the slot 22. This deflection creates friction (locking force) between the ring segment 34 and the threaded shaft 12 when the bolt 10 is threaded into the nut body 18. The greater this deflection, the greater the locking force. As a result the nut body 18 will not loosen in any unauthorized manner from the bolt 10 due to vibration. However the user can install the bolt 10 using a wrench (not shown) and can also loosen the bolt 10 if the user desires.

Each ear 38 and 40 has a shape of narrow ends and an enlarged middle section. The size of the middle sections is to closely conform to the width of the grooves 30 and 32. As a result the ears 38 and 40 restrain laterally the ring segment 34 preventing lateral movement of the ring segment 34. The enlarged middle sections of the ears 38 and 40 also function as pivot points permitting the pivoting of the ring segment 34 which is permitted because from the middle section to the ends of the ear 38 and 40 there is a clearance provided that allows the ears 38 and 40 to pivot.

Figure 10:
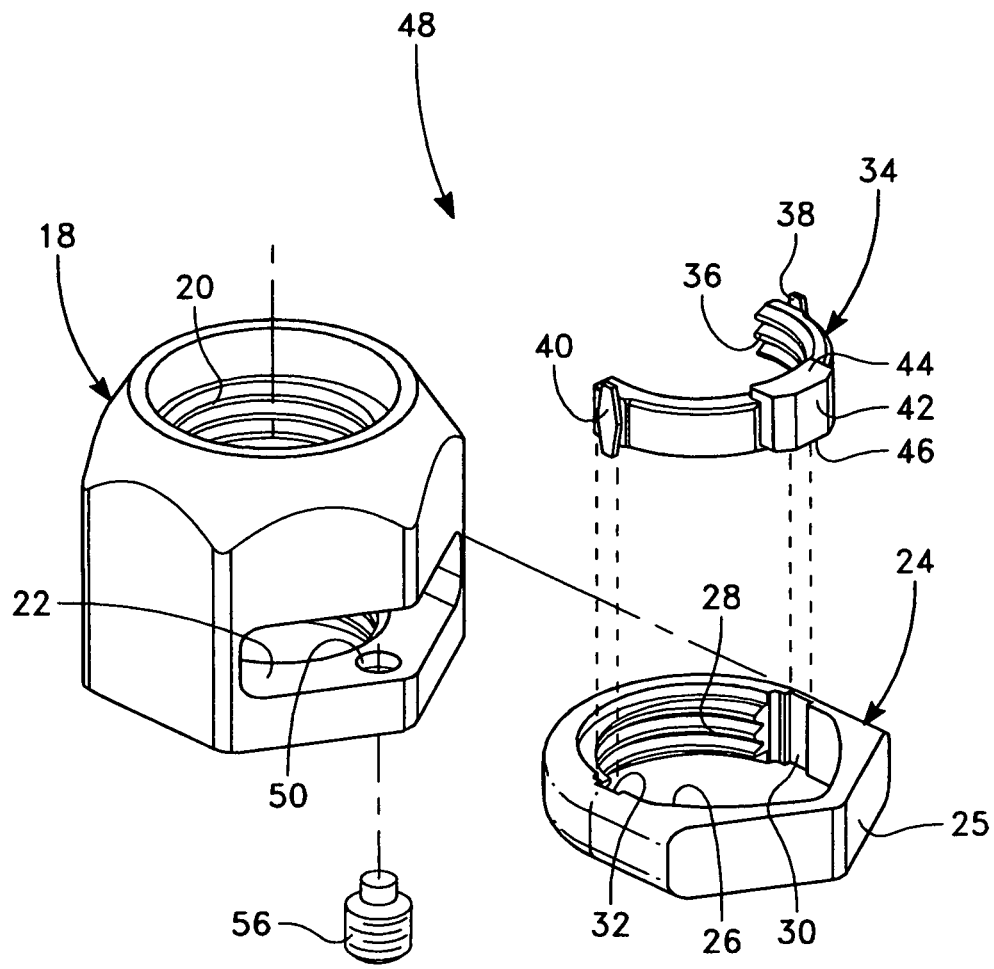
FIG. 10 is an isometric view of the second embodiment of locknut of this invention in a disassembled state.
Figure 11A:
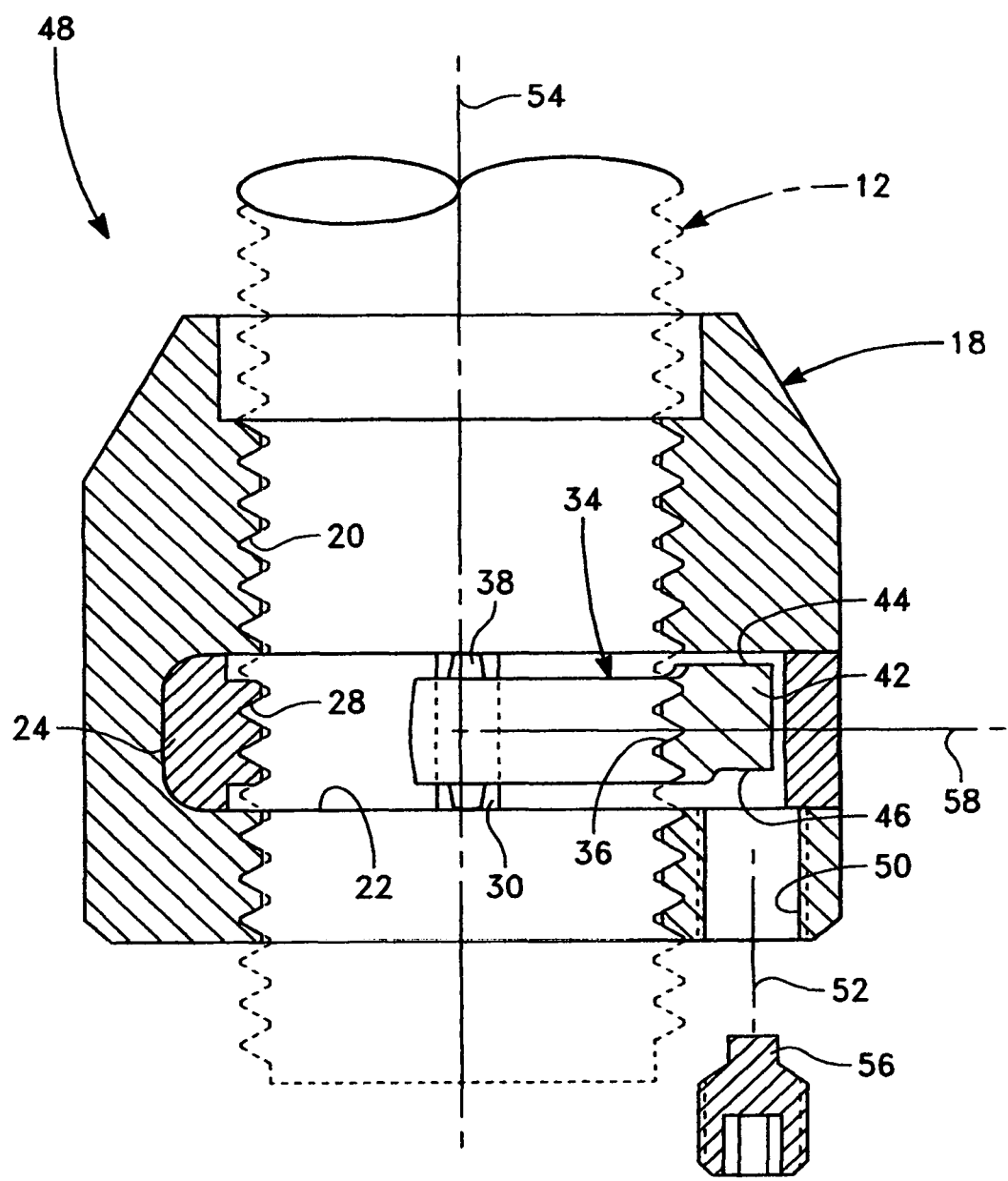
FIG. 11A is a longitudinal cross sectional view of the assembled locknut of FIG. 10 where the set screw is not inserted within its threaded hole.
Figure 11B:
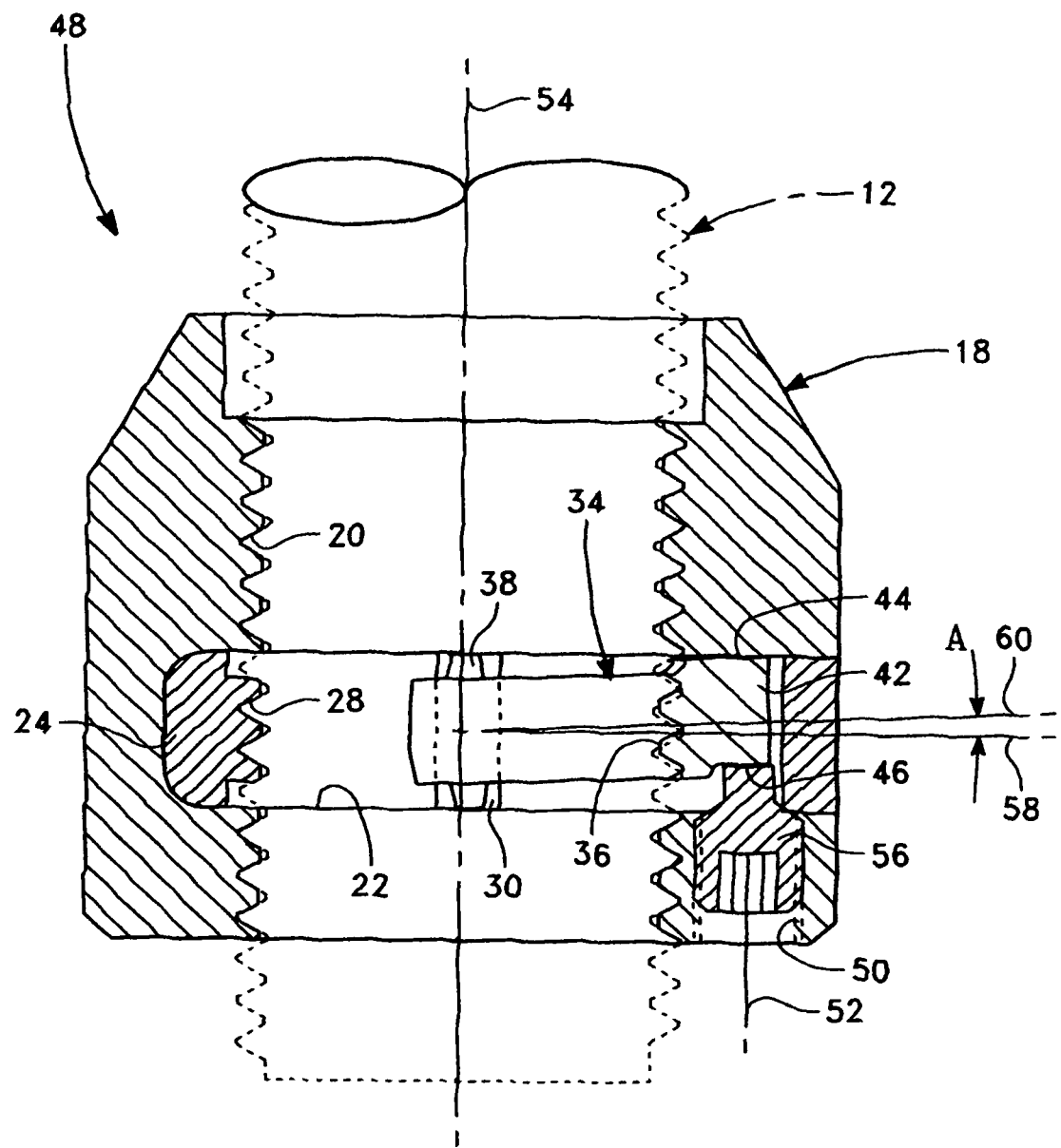
FIG. 11B is a view similar to FIG. 11A but with the set screw fully inserted within its threaded hole.

Referring specifically to FIGS. 10-12 there is shown a second embodiment 48 of locknut. Like numerals have been used to refer to like parts from the first embodiment previously described. Nut body 24 has a hole 50 which has a center axis 52. Center axis 52 is parallel to the center axis 54 of the through opening 20. A set screw 56 is to be threaded into hole 50. When the set screw 56 does not touch loading foot 46 the ring segment 34 has a transverse axis 58 which is perpendicular to central axis 54. When the set screw 56 is not installed in hole 50 there is no frictional force applied against threaded shaft 12. When the set screw 56 is tightened against loading foot 46 and the threaded shaft 12 is not installed in threaded opening 20 the ring segment 34 will deflect the maximum (about two degrees) shown by line 60 in FIG. 11B. With the ring segment 34 deflected, upon installing threaded shaft 12 in threaded opening 20, frictional binding will occur between the threaded shaft 20 and ring segment 34 preventing unauthorized disengagement of the nut body. Set screw 56 can be loosened from the position shown in FIG. 11B to achieve different lower loading forces.

The invention claimed is:

1. A locknut comprising:
a nut body having a first through opening which has a first series of screw threads, a slot formed within said nut body which connects with said first through opening;
a shim which has a second through opening, said shim to be located within said slot, said second through opening having a second series of screw threads which matches said first series of screw threads;
a ring segment having an inner screw threaded surface, said ring segment to be located within said second through opening, said ring segment being pivotable a limited amount producing deflection of said ring segment; and
whereby when a bolt is threadably attached to said first through opening said bolt is to engage with said inner screw threaded surface of said ring segment producing a frictional locking force between said nut body and the bolt which prevents unauthorized disengagement of said nut body from the bolt.

2. The locknut as defined in claim 1 wherein:
said pivoting of said ring segment being accomplished by a pair of ears which are mounted on the exterior surface of said ring segment, each said ear to be located within a separate oversized groove formed in the wall surface of said second through opening.

3. The locknut as defined in claim 1 wherein:
said ring segment having an upper edge and a bottom edge with said inner screw threaded surface located there between, a loading foot mounted on said upper edge, said loading foot protrudes from said upper edge, when said shim is installed in said slot said nut body presses against said loading foot causing said deflection of said ring segment.

4. The locknut as defined in claim 3 wherein:
a stop lug mounted on said bottom edge of said ring segment, said stop lug protruding from said bottom edge, said stop lug to press against said nut body to limit the amount of pivoting of said ring segment.

5. The locknut as defined in claim 1 wherein:
said shim having an outer edge which is flush with the exterior surface of said nut body when said shim is fully installed in said slot, said ring segment is located directly adjacent said outer edge of said shim.

6. The locknut as defined in claim 1 wherein:
said nut body, shim and ring segment are all constructed of metal and there are no non-metallic parts included in said locknut.

7. The locknut as defined in claim 1 wherein:
a set screw threadably mounted in said nut body, said set screw to connect with said ring segment, tightening of said set screw causes deflection of said ring segment.

8. A locknut comprising:

a nut body having a first through opening, said first through opening having a central longitudinal axis;

a slot formed in said nut body which connects with said first through opening;

a shim which has a second through opening, said shim to be located within said slot, said second through opening aligns with said first through opening;

a ring segment located within said second through opening, said ring segment being longitudinally deflectable;

a set screw movably mounted in said nut body, said set screw being movable on an axis which is parallel to said central longitudinal axis; and when a bolt is mounted within said first through opening and connecting with said ring segment a frictional locking force is created due to the deflection of said ring segment.

\* \* \* \* \*